July 12, 1960 R. L. GREGORY 2,944,867

RECORDING DEVICE

Filed March 1, 1956 6 Sheets-Sheet 1

INVENTOR
RICHARD L. GREGORY

By Watson, Cole, Grindle & Watson
ATTORNEYS

July 12, 1960 R. L. GREGORY 2,944,867

RECORDING DEVICE

Filed March 1, 1956 6 Sheets-Sheet 2

INVENTOR
RICHARD L. GREGORY

BY Watson, Cole, Grindle & Watson
ATTORNEYS

July 12, 1960 R. L. GREGORY 2,944,867

RECORDING DEVICE

Filed March 1, 1956 6 Sheets-Sheet 3

INVENTOR

RICHARD L. GREGORY

BY Watson, Cole, Grindle & Watson

ATTORNEYS

July 12, 1960 R. L. GREGORY 2,944,867

RECORDING DEVICE

Filed March 1, 1956 6 Sheets-Sheet 4

INVENTOR
RICHARD L. GREGORY

By Watson, Cole, Grindle & Watson
ATTORNEYS

July 12, 1960 R. L. GREGORY 2,944,867
RECORDING DEVICE
Filed March 1, 1956 6 Sheets-Sheet 5

INVENTOR
RICHARD L. GREGORY
By
Watson, Cole, Grindle & Watson
ATTORNEYS

INVENTOR
RICHARD L. GREGORY
By Watson, Cole, Grindle & Watson
ATTORNEYS

United States Patent Office 2,944,867

Patented July 12, 1960

2,944,867

RECORDING DEVICE

Richard Langton Gregory, The Psychology Laboratory, Downing Place, Cambridge, England Filed Mar. 1, 1956, Ser. No. 568,790

Claims priority, application Great Britain Mar. 1, 1955

7 Claims. (Cl. 346—59)

Figure 1:
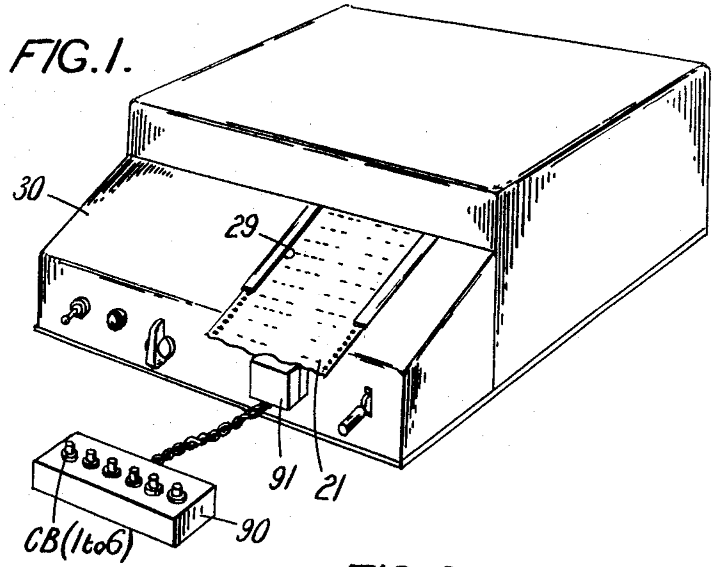

The invention relates to a device (herein referred to as a printing chronograph) for recording the occurrence of events (e.g. operations of control members, or process changes) and the times at which they occur.

The invention provides a printing chronograph which comprises a "counter" and means for driving the counter at a constant speed whereby a time base is provided, the counter being capable of producing a printed record of the total at any time, means responsive to an electrical impulse (corresponding to the occurrence of an event to be recorded) to operate (or condition for operation) printing means to record that impulse on strip record material and also to print, in alignment or other co-related relation with the record, the counter reading, and means for advancing the strip material a step after each printing operation.

The invention further provides a printing chronograph which comprises means for printing, at any particular time, a symbol (or group of symbols) representing that time, solenoid-operated means responsive to electrical impulses for operating, or conditioning for operation, means for printing symbols (or groups of symbols) representing events, as they occur, and means for producing a single short electrical impulse capable of effecting (directly or indirectly) operation of the solenoid means on the occurrence of an event of longer duration than the impulse, comprising switch means operable (manually or automatically) on the occurrence of the event to close a direct current electric circuit containing the solenoid, a capacitor, and a resistor constituting a leak around the capacitor whereby closing of the switch causes a short capacitor-charging surge or impulse sufficient to energise the solenoid or relay, said impulse being arranged also to effect operation of the time printing means.

In one form of the invention the time printing means comprise a counter with type faces, a motor (e.g. of the synchronous type) for driving the counter at a constant rate and means operable (directly or indirectly) by an impulse produced as aforesaid for printing an impression from the counter reading. There may be an intermittent drive to the counter (e.g. the drive may include a Geneva motion) and the impression making means may be operable only when the counter is stationary. The impression making means may comprise a solenoid in a circuit controlled by a switch operable in synchronism with the counter to close the circuit only when the counter is stationary, said circuit also being controlled by the impulses so that printing is only effected when an impulse has been received and the counter is stationary.

According to a preferred form of the invention the impulses operate a relay which, when energised, closes a self-holding circuit for the relay which remains closed until the next operation of the time printing means, and effects energization of the solenoid for the printing of the event symbol. The relay may also constitute the impulse control for the circuit for the impression making means as aforesaid.

The chronograph may have several independently operable means for printing "event" symbols and independent means for producing impulses to effect operation of such printing means, whereby the occurrences of different events may be isolated and recorded either separately or, if they occur simultaneously, at the same time. Such independent recording means are herein referred to as "channels."

When the time recording means include a counter as above described which is of the kind which, after it has attained the maximum reading for which it is designed, automatically returns to zero (or some other starting point) and starts a fresh count, it may be desirable to record such a fresh start. For this purpose the attainment of the maximum reading (or the starting of a fresh count) may be regarded as an "event" and a separate channel may be provided and allocated to the recording of such events.

It is a preferred feature of the invention that the records are made on a continuous strip of record material (e.g. paper) and the strip is advanced a step at a time only after the printing of an "event" symbol and the accompanying time symbol. The chronograph may accordingly include means for advancing a record strip in this way.

It is an advantage of the multi-channel form of the invention that each event, however long it may last, produces only one short impulse which effects the recording operation and the mechanism is then free for operation by another channel.

The "events" may be recorded as they occur by manual operation of switch means to produce an electrical signal or such signals may be produced, in known manner, automatically by variations in such phenomena as light, sound, heat, capacity, inductance and radio-activity.

Figure 2:
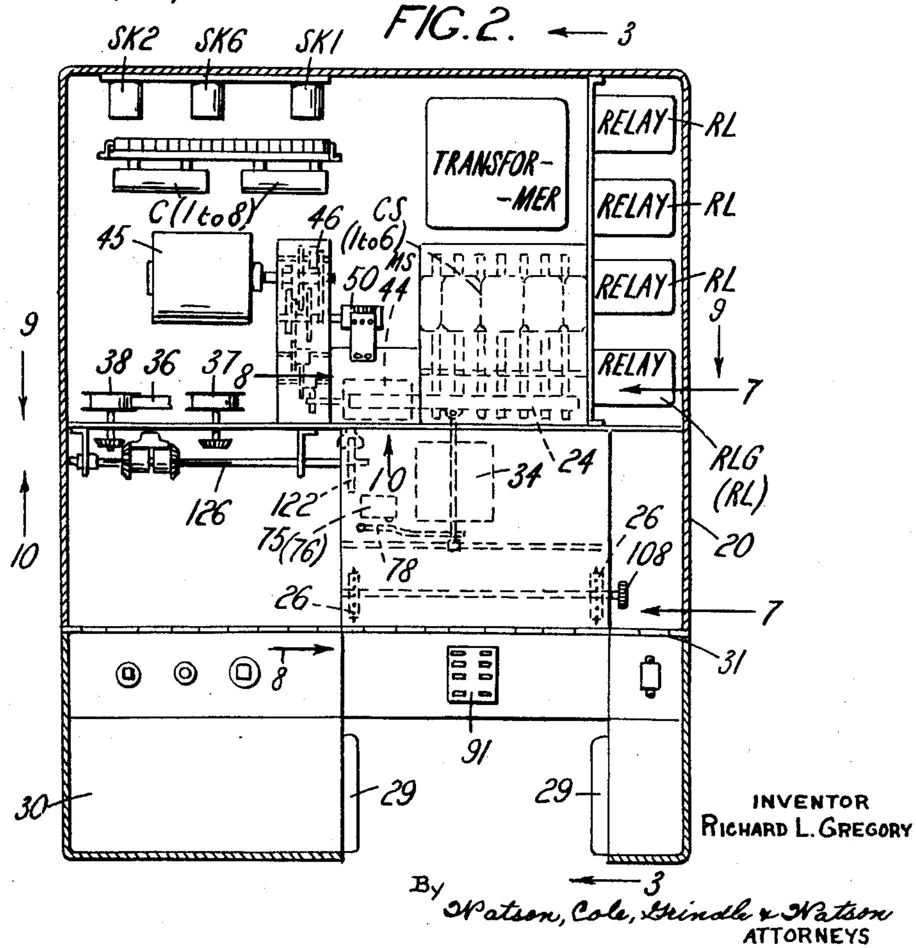
Figure 3:
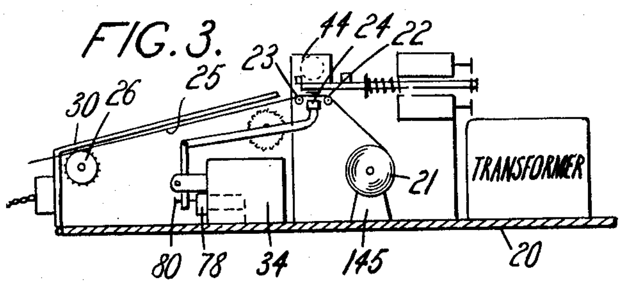
Figures 4, 5, 6:
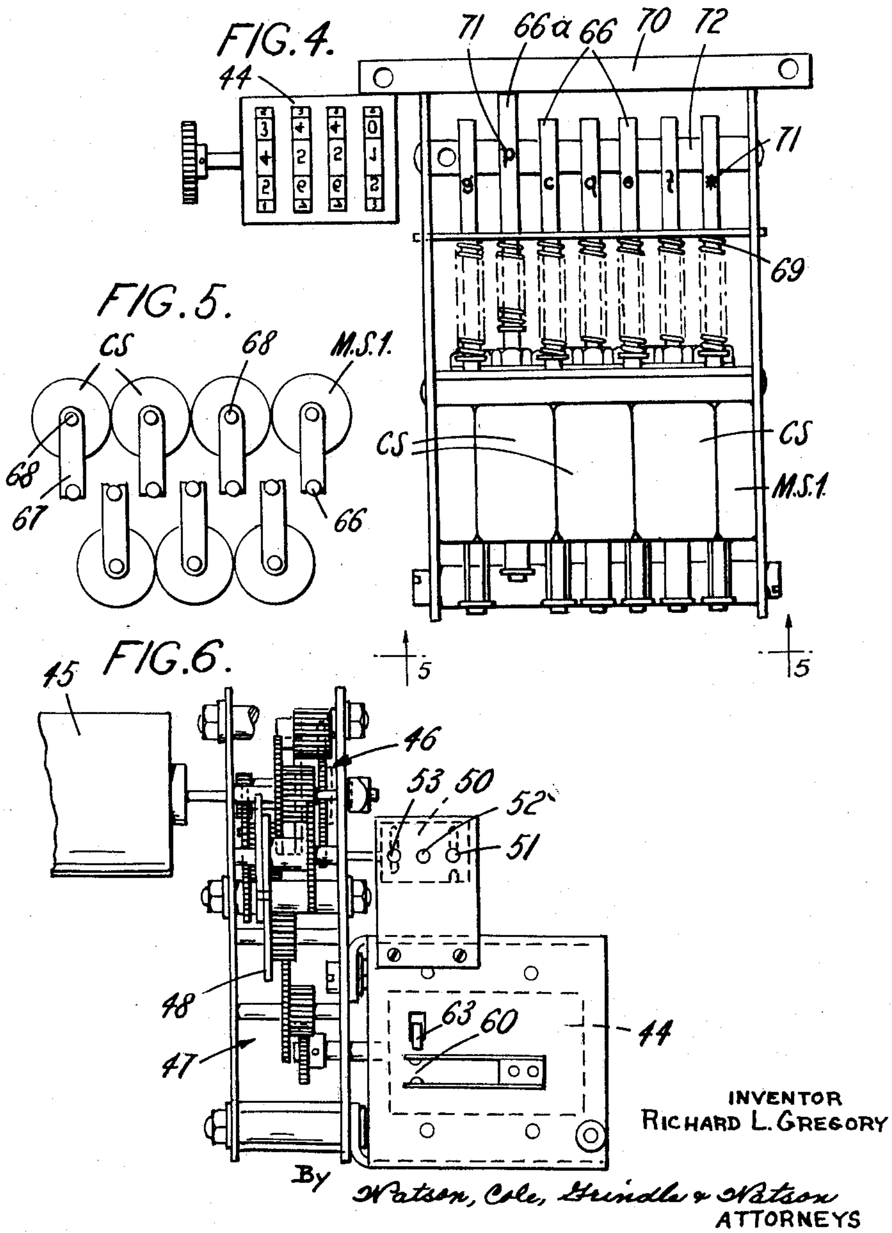
Figure 7:
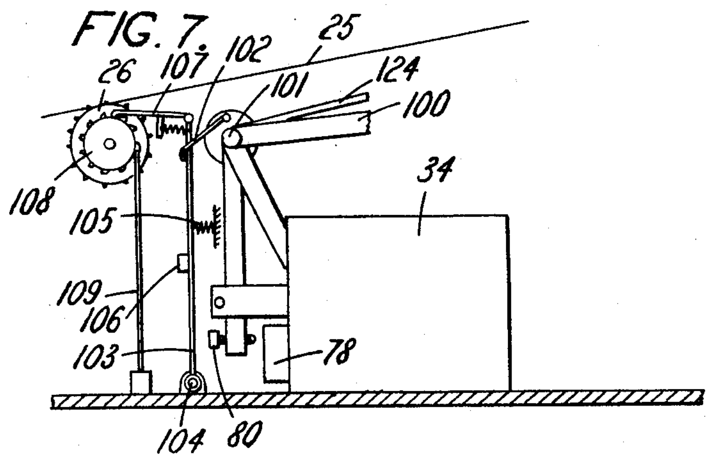
Figures 8, 9:
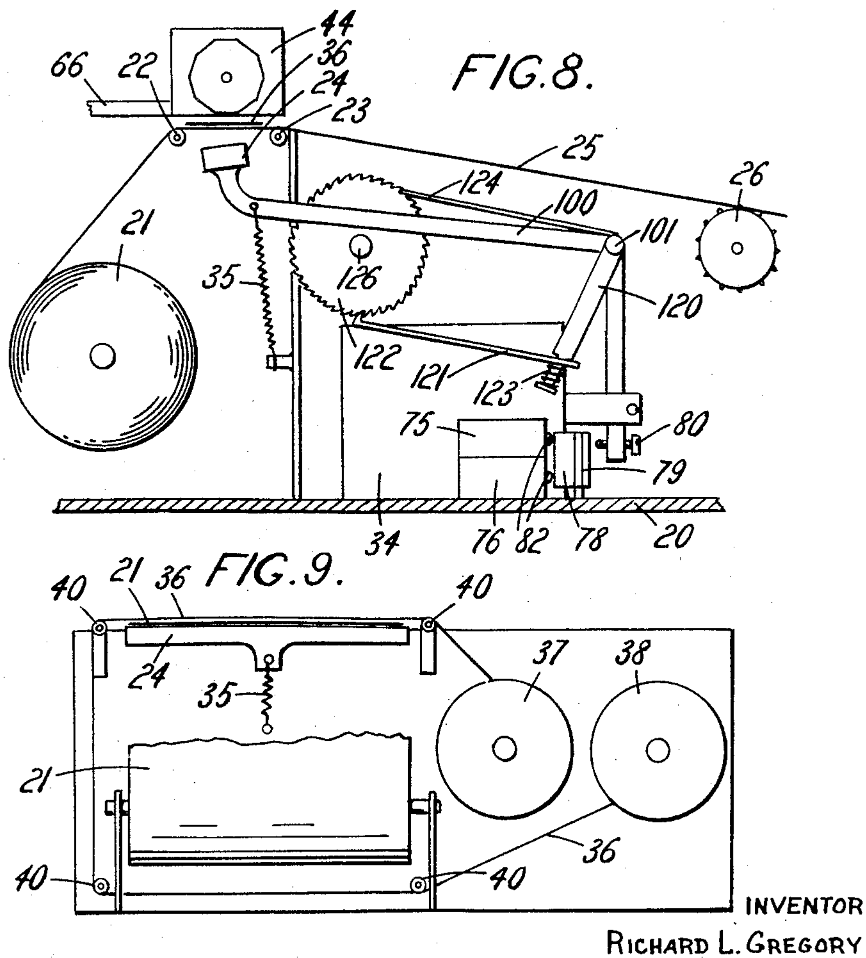
Figure 10:
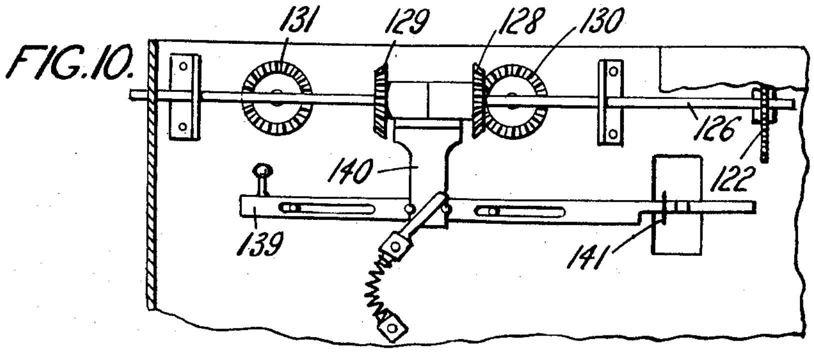
Figure 11:
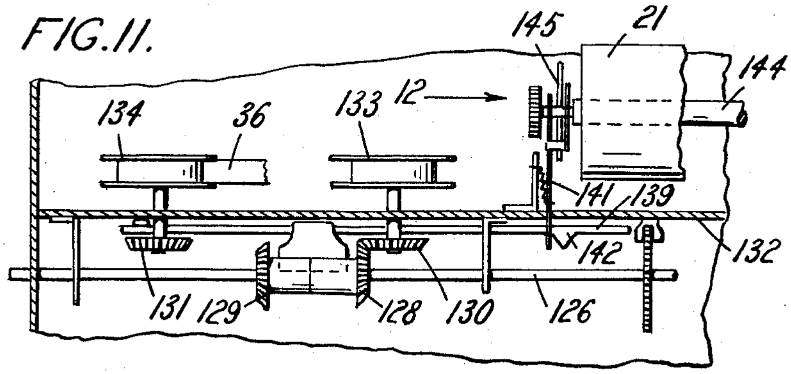
Figure 12:
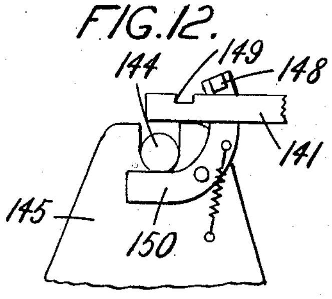
Figure 14:
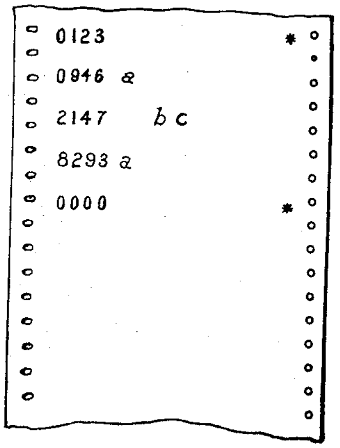
Figure 13:
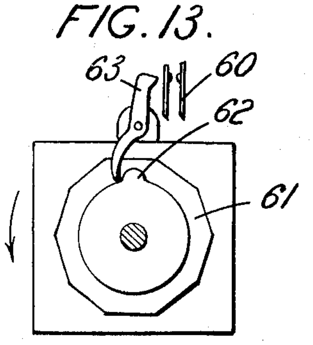
Figure 15:
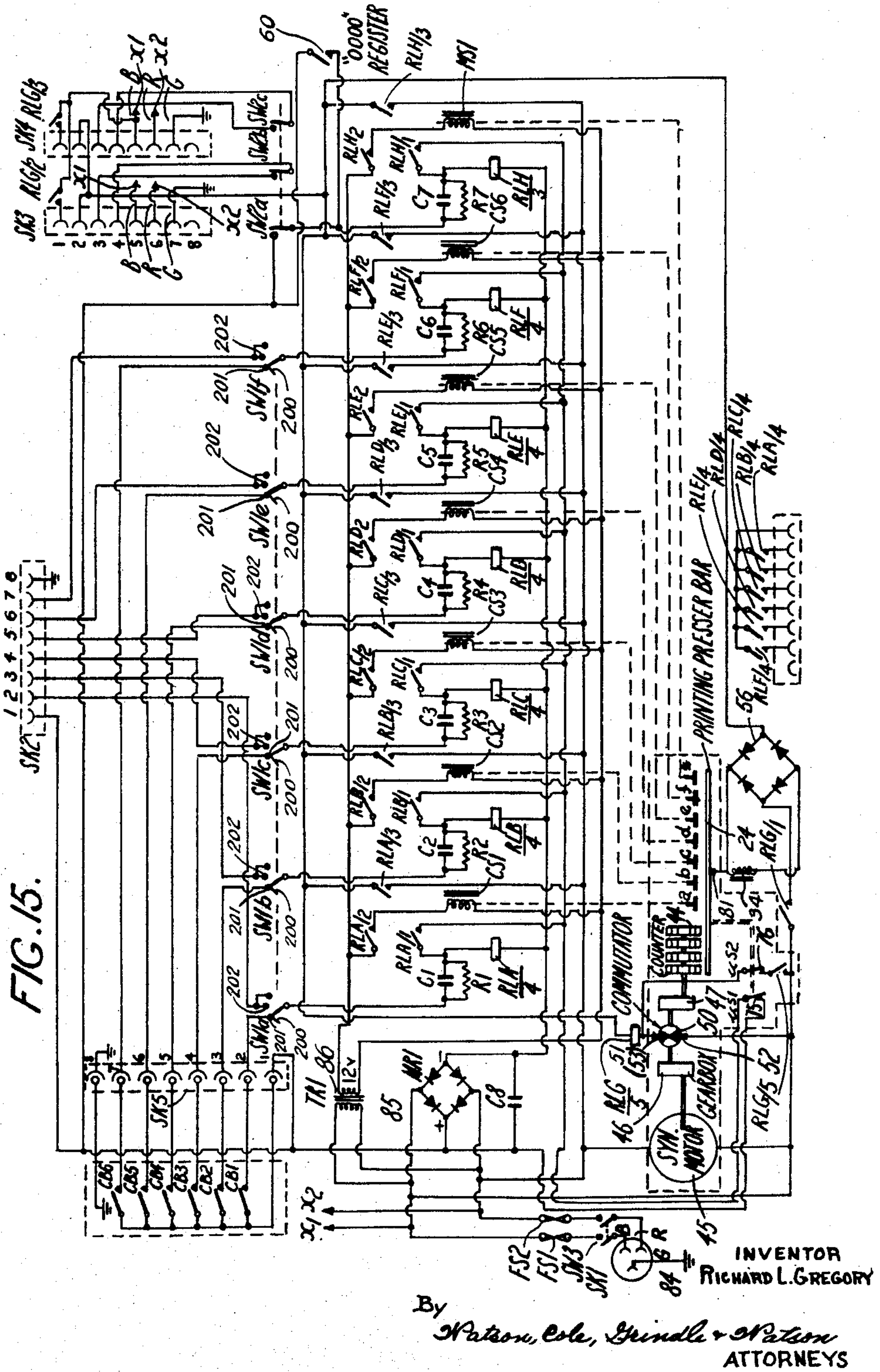
Figure 16:
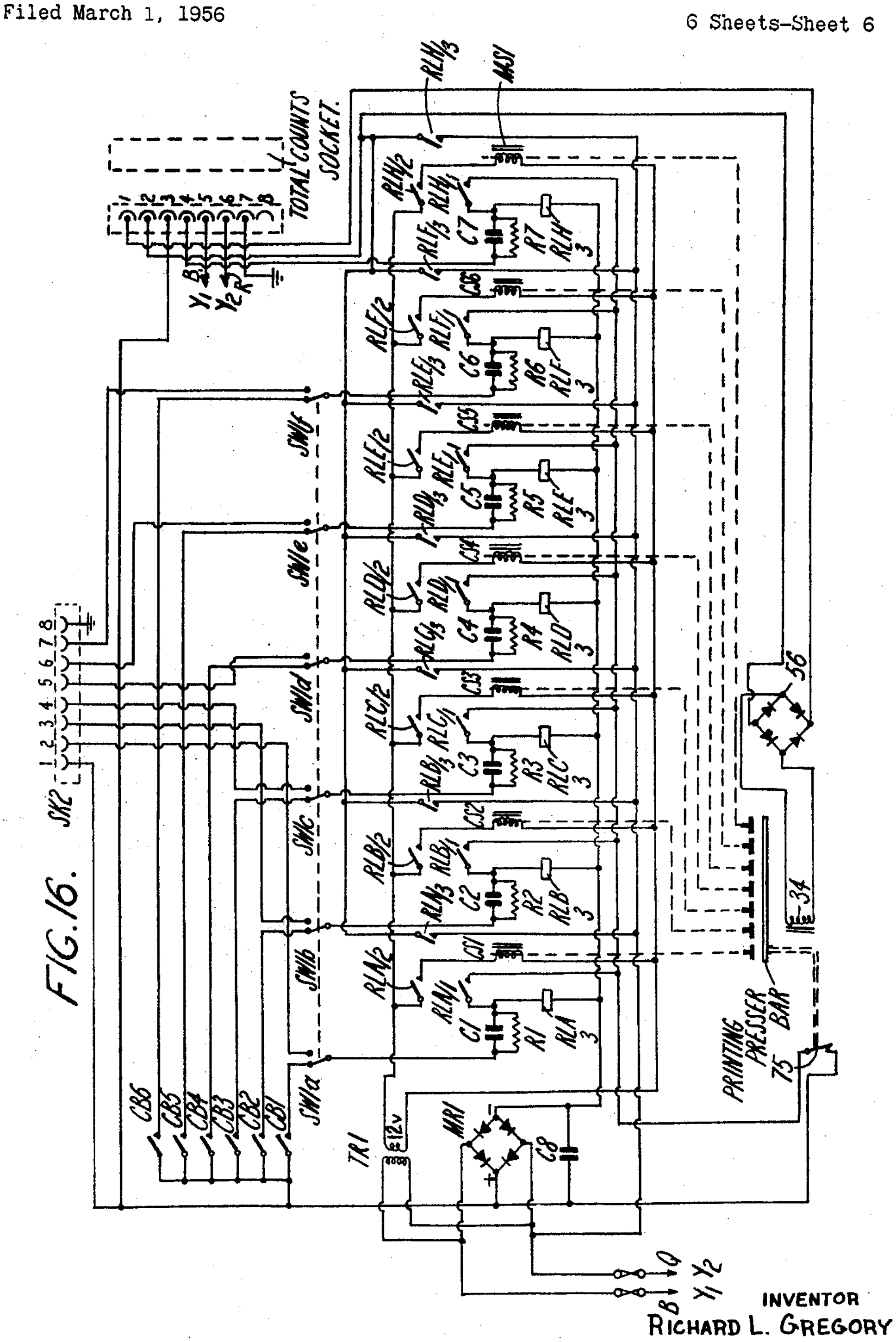

As an example of how the invention may be carried into effect, a specific construction of a multi-channel printing chronograph embodying the above and other features, will now be described with reference to the accompanying drawings which are to a large extent diagrammatic and in which:

Figure 1 is a perspective view of the chronograph,

Figure 2 is a plan view of the chronograph with one part of the cover removed and another part folded back, Figure 3 is a section on the line 3—3 in Figure 2, but showing the above-mentioned portion of the cover in its folded over, operative, position, Figure 4 is an under plan of the counter and of the symbol printing means, Figure 5 is an end view, in the direction 5—5 in Figure 4, showing the arrangement of the solenoids for operating the symbol printing means, Figure 6 is a plan view showing the means for driving the counter and a rotary switch, Figure 7 is a section on the line 7—7 in Figure 2, Figure 8 is a section on the line 8—8 in Figure 2, Figure 9 is a view in the direction 9—9 in Figure 2, Figure 10 is a view in the direction 10—10 in Figure 2, Figure 11 is a plan view of the mechanism shown in Figure 10, Figure 12 is a detail view in the direction of the arrow 12 in Figure 11, Figure 13 shows a switch operated by the counter, Figure 14 shows a portion of a record strip produced by the machine, Figure 15 is a circuit diagram of the machine, and Figure 16 is a circuit diagram of a "slave" machine.

The chronograph forming the subject of this example has time printing means and seven channels by which records of events may be made, six of the channels being allocated to events external to the chronograph and one to internal events.

The machine comprises a base 20 carrying means for supporting a reel of paper 21 and guides 22, 23 for leading the paper over a presser bar 24 and then over a table 25 to a pair of sprocket wheels 26 which make feeding engagement in marginal perforations 27 in the paper. The paper is guided in engagement with the sprocket wheels by turned down edges 29 of the portion 30 of the cover which is shown folded back about the hinge line 31 in Figure 2. The presser bar 24 is arranged for up and down movements by means of a solenoid 34 which is secured to the base 20, the upward movements being effected by energisation of the solenoid. The return movements are effected by a spring within the solenoid in co-operation with a spring 35. These return movements are arranged, as later described, to operate a pawl and ratchet device to rotate the sprocket wheels 26 to advance the paper strip in steps of about ¼ inch.

Extending transversely across the upper face of the paper 21 above the presser bar 24 there is an ink ribbon 36. This ribbon extends between a pair of reels 37, 38 over four guide rollers 40 as seen in Figure 9. The ribbon is progressively advanced during the operation of the machine by means later described.

Mounted above the ribbon at one side of the paper strip there is a four figure mechanical counter 44. This counter is driven by a synchronous electric motor 45, a gear train 46, 47 and a Geneva motion 48, the gear ratios and arrangement of the Geneva motion being such that the counter advances step by step one unit each 0.1 second. The train 46 however incorporates a speed change by which, if desired, the rate of advance of the counter may be reduced to one unit every second.

The figures of the counter have type faces and are aligned across the paper. The arrangement is that upward movement of the presser bar 24 presses the paper 21 and intervening ink ribbon 36 against the lowermost row of figures and so prints the figures on the paper, the figures representing time in tenths of a second (or seconds if the alternative gear is engaged) from a datum.

Rotatable with the driving member of the Geneva motion there is a rotary switch or commutator 50 which completes a circuit only during the idle periods when the counter is stationary. This switch has adjacent one end a set of four contacts, a single contact adjacent the other end and a central slip ring portion, which are engaged by three brushes 51, 52, 53. The brush 51 co-operates with the set of four contacts and is intended for use when the unit-per-second gear is engaged so as to make four contacts per second. The brush 53 co-operates with the single contact and is for use when the one unit per one-tenth of a second gear is engaged. In each case contact is made for about one-thirtieth of a second. The brush 52 and the central slip-ring provide a common return connection.

The rotary switch controls the energisation of the coil RLG of a relay which has self-holding contacts RLG/5 and contacts RLG/1 in the circuit of the presser bar solenoid 34, the solenoid being supplied with direct current through a rectifier 56.

There is also a switch 60 (see Figures 6, 13 and 15) which is operated by the counter when it reaches its maximum reading (9999) and is returning to zero. The "hundreds" wheel 61 of the counter has a cam 62 which, as the zero turns to the bottom, rocks a lever 63 momentarily to close the contacts 60.

For the seven channels there are relays RL (A to F and H) and "event" solenoids CS (1 to 6) and MS1, respectively which, when energised, control the printing on the paper of symbols (letters *a* to *f* and an asterisk) in line with the counter figures. The symbols are in the form of type carried on square bars 66 coupled by arms 67 to the armatures 68 of the solenoids. Springs 69 urge the bars towards the solenoids. When a solenoid is energised its bar is projected away therefrom to engage its end with a stop 70, e.g. as in the case of the bar

**66*a* in Figure 4. When a bar is so projected the type symbol (71) carried thereby lies on top of the ink ribbon 36 over the paper above the presser bar 24 and in alignment with the counter figures. Upward movement of the presser bar 24 then operates to print the symbol as well as the counter reading. The symbol bar is backed-up by a cross-member 72** which, by engagement with a flat face of the bar, also prevents rotation thereof. When the solenoid is de-energised the spring withdraws the symbol from the printing position.

Associated with the presser bar there are two so-called micro-switches 75, 76, both of which are normally closed but are opened just before the bar reaches the top of its upward movement. To effect the opening of the switches there is a cranked lever 78 pivoted at 79 on a pillar secured to the base 20 and arranged for engagement at its free end by an adjustable screw 80 when the armature 81 of the solenoid 34 has nearly reached its innermost position. The lever then operates the plungers 82 of the switches.

The machine is arranged for operation from alternating current mains 84 and includes a full-wave rectifier 85 and a low tension transformer 86.

The circuit arrangements and the operation of the machine will now be described.

The seven channels have similar circuits (see Figure 15) as follows, the seven circuits being in parallel. For the six external channels there are channel operating switches (CB1 to CB6) in the form of push buttons carried on a stand 90 (Figure 1) having a lead to a plug and socket connection 91 in the casing beneath the outcoming paper strip 21. There are also, in parallel with the switches CB, sockets SK2 for insertion of remote switches for alternative use. Ganged changeover switches (SW1*a* to SW1*f*) are provided for selection of switches CB and the sockets SK2, the switches SW1 having three positions in which, respectively, only switches CB are in circuit, both the switches and the sockets are in circuit, and only the sockets are in circuit. In order to obtain the second position, the movable switch elements have have bar contacts 200 which engage both of contacts 201 and 202 connected to the switches CB and the sockets SK2 respectively. In the case of the "internal" channel the above-mentioned switch 60 which is operated by the counter when it reaches its maximum reading, and the switch SW2*a* later described both constitute channel operating switches. The switches CB and/or the remote switches (depending on setting of switches SW1) may be used to effect a record through the appropriate channel of an external "event" and the switches 60 and SW2*a* may be used to effect a record of an internal event. Each channel operating switch is in a circuit supplied by the rectifier 85 and containing the coil of one of the channel relays RL (A to F and H), a capacitor C (1 to 7) and a resistor R (1 to 7) shunted around the capacitor to constitute a leak. The capacitor has a value such that on closing the channel operating switch there is a charging impulse or surge sufficient to energize the relay RL and lasting for a period preferably longer than the period of opening of the rotary switch 50 but not long enough to overlap two consecutive periods in which the switch is closed (otherwise a single "event" might be recorded twice).

Each of the channel relays RLA to RLF has four sets of contacts all of which are closed on energization of the relay coil. Relay RLH has only three sets of contacts. One of these sets (RLA/1 to RLF/1 and RLH/1) of each relay is in a circuit, supplied by the rectifier, containing the relay coil and in parallel with the capacitor C (1 to 7). The circuit also contains the micro-switch 75 operated by the presser bar solenoid 34. The arrangement operates as a holding circuit retaining the relay coil energized and the contacts closed after the end of the impulse until the printing means have been brought into operation when the coil is de-energized by opening of switch 75. Another of the sets of contacts (RLA/2 to RLF/2 and RLH/2) is in a circuit, supplied by the transformer 86, containing the "event" solenoids CS (1 to 6) or MS1 whereby the solenoid is energized during the time that the relay coil is energized. The third set of contacts (RLA/3 to RLF/6 and RLH/3) is in a circuit, supplied from the mains, containing the presser bar operating solenoid 34 and the contacts RLG1 of the relay RLG. The fourth set of contacts (RLA4 to RLF4) are connected to an external socket SK6 into which there may be plugged leads to a set of electrically operated visual counters so that there is available visual records of the number of times the solenoids are energized.

The operation is as follows. The six external channels are appropriated to external "events" and on the occurrence of an event the switch CB or a remote switch plugged into socket SK2, appropriate to the event is closed manually or automatically. This causes an impulse which energizes the corresponding channel relay RL (A to F) thereby closing the holding circuit, the circuit for the "event" solenoid and the circuit of the presser bar solenoid. The last circuit however is not completed unless or until the rotary switch is closed and the relay RLG controlled thereby is energized. When that happens the presser bar is operated to print the time and the symbol appropriate to the event. Just before the limit of the upward stroke of the presser bar the switch 75 is opened, which releases the energized channel relay and the switch 76 is opened which releases relay RLG. The final part of the upward printing stroke is effected by the momentum of the parts and the residual magnetism of the solenoid. During the return stroke of the presser bar the paper and ink ribbon are both advanced. The seventh channel operates in similar manner to print a symbol (i.e. an asterisk) when the counter reaches 9999, the closing of the counter operated switch 60 being equivalent to the closing of an external "event" switch. Operation of switch SW2*a* produces a similar result.

The circuit through contacts RLG5 acts as a holding circuit for relay RLG and ensures that printing will be effected even if the rotary switch 50 opens before completion of the upward movement of the printing bar by solenoid 34. The holding circuit is broken by the opening of switch 76 just before the end of the upward movement.

Figure 14 represents a typical section of a paper record produced by the machine.

It should be appreciated that the several channels can operate independently or together according to the incidence of "events," that the fact of an event occurring during the changing of the counter figures is "stored" until the counter is stationary and the time is then printed and that no record is made and no paper is fed except on the occurrence of an "event" whereby a compact record is obtained. Furthermore even if one channel is occupied by an event of long duration only one record is made and there is no interference with the operation of other channels.

In some cases where it is desired to increase the number of different events which can be recorded, additional "events" switches may be provided and arranged to operate two (or more) channels simultaneously according to a code, the result being that one event prints two (or more) symbols. Alternatively, or in addition, supplementary or slave machines having additional channels (but not necessarily time printing means) may be added to the machine described above. Furthermore the number of external channels in the machine itself may be varied.

Figure 16 shows a circuit diagram for a slave machine without time printing means. It will be observed that the arrangement is similar to that of the master machine described above but is simplified by the omission of the time printing means. The slave machine has its own paper and ribbon feeding means which operate in synchronism with the master machine. An event recorded on either machine advances the paper for both and records the time on the master record strip.

The master machine described above is provided with sockets SK3 and SK4 for connection of one or two slave machines by plugging in slave plugs SK1.

It is desirable that the beginning of a series of recordings should be indicated on the master-record strip and also, when provided, on the slave strips. For this purpose there is provided in the master machine a manually operable set of ganged switches SW2*a*, SW2*b* and SW2*c*. Switch SW2*a* is in parallel with switch 60 of the master and the switches SW2*b* and SW2*c* take the place of switch 60 in the slave machines so that operation of the switches SW2 at the beginning of a series effects, on the master record, the printing of the counter reading and an asterisk and, on the slave records, the printing of an asterisk.

The relay RLG has contacts RLG2 and RLG3 which, on energisation of the relay coil through the rotary switch and a channel relay complete the printing solenoid circuits of the slave units so that an event recorded on any unit causes, as already mentioned, the advance of all the paper strips and the printing of the counter reading on the master.

The means for feeding the paper strips and the ink ribbon will now be described in more detail.

The presser bar 24 is carried on a bell crank lever 100 which is rocked by the solenoid 34 and is secured to a rock-shaft 101. The movements of this shaft are employed to feed both the paper and the ribbon, the feeding movements being derived from the return, idle, stroke of the presser bar.

To feed the paper, the shaft 101 carries an arm 102 which is hooked to engage behind (on the left as seen in Figure 7) an upright 103 pivoted at 104 to the base 20. This upright is urged by spring 105 up to a stop 106. At its upper end the upright carries a pawl 107 which engages a ratchet wheel 108 on the shaft of the paper feeding sprocket wheels 26. Accordingly movements of the upright to the left operate to rotate the sprocket wheels and to advance the paper, in steps, by one quarter of an inch each step. A spring blade 109 prevents return movements of the wheel 108.

To advance the tape there is an arm 120 fixed to the shaft 101 and carrying at its lower end a hooked pawl 121 which is pressed upwardly into engagement with a ratchet wheel 122 by a spring 123. Accordingly the idle movements of the shaft 101 rotate the wheel 122 anti-clockwise (Figure 8) one tooth at a time. A pawl 124 loose on shaft 101 prevents return movements of the ratchet wheel. The wheel is splined to a shaft 126 which is supported in bearings for axial sliding movement (see especially Figures 10 and 11). Secured to the shaft there are a pair of bevel gears 128, 129 which are alternatively engageable with bevel gears 130, 131 on spindles supported for rotation by bulkhead 132, the spindles carrying at the rear of the bulkhead the ribbon reels 37, 38. Accordingly one or other of these reels is intermittently rotated by the operation of solenoid 34 depending upon which pair of bevel gears is engaged. To effect the axial movements of the gears 182, 129 and shaft 126 there is a bar 139 guided on the bulkhead for manual sliding movement and having a blade 140 between the gears. The inner, right hand end (Figure 11) of the bar 139 passes through a slot in a locking bar 141 which passes through the bulkhead. The bar 139 has a cam 142 which, as the bar is moved, draws the bar 141 through the bulkhead. On the other side of the bulkhead the bar 141 is guided for movement over the spindle 144 of the reel of paper 21. The spindle is supported in a fork in an upright pedestal 145 and, normally, the bar 141 overlies the spindle and retains it in the fork as seen in Figure 12. When the bar 141 is withdrawn by the cam a latch 148 engages a notch 149 in the bar and holds the bar withdrawn so that the spindle may be removed. The latch 148 has a tail 150 which rises above the bottom of the fork when the latch is engaged in the notch. Accordingly pressure applied to the latch during replacement of the spindle releases the bar 141 which returns, by spring action, over the spindle.

The length of paper in a reel and the length of tape together with the rate of advance of each are so chosen that the tape is advanced nearly its full length during the printing of a reel of paper. The operation of inserting a new reel of paper involves withdrawal of the bar 141 to release the spindle 144, by movement of the bar 140 which has the effect of changing over the drive to the tape reels so that replacement of the paper automatically results in reversal of the tape movement.

The machine may be modified to record changes in variables. For example the value of a variable at any time may be represented by the reading of a reversible counter which is aligned with the time counter and any change in the reversible counter may operate as an "event" switch to effect a printing of both counter readings.

The invention is not restricted to the details of the above example. For instance, an electro-magnetic counter operated by pulses of suitable length at ten pulses per second (generated by a spring clock or a valve circuit) may be used in place of the purely mechanical counter described. Again counters for the events recorded on each channel may be used as the printing members, whereby the total number of events in any particular period is automatically made available by comparison between the figures printed at the beginning and end of the period.

I claim:

1. A printing chronograph which comprises means for printing at any particular time, symbols representing that time, at least two independently operable printing members for printing symbols representing different events, a corresponding number of solenoid operated means for conditioning for printing operation any of the event symbol printing members, solenoid operated means for taking simultaneously printing impressions from the time printing symbols and from a conditioned event symbol printing member, and means for producing on the occurrence of an event an electrical impulse of fixed short duration independent of the length of the event, means for making an impulse so produced effective to cause operation of the conditioning means of a symbol printing member representing that event and also to cause operation of the solenoid operated printing impression taking means, and means for de-conditioning the conditioned symbol after the impression taking operation.

2. A printing chronograph in accordance with claim 1 further including a relay with a coil and a self-holding circuit, said coil being connected for energisation by an impulse from said impulse producing means and wherein said self-holding circuit includes a switch operable by the printing impression taking means on operation thereof to break the holding circuit, said relay also having contacts in circuit with one of said event symbol conditioning solenoids whereby energisation of the relay coil by an impulse effects conditioning of a symbol printing member and deconditioning is effected after the printing impression.

3. A printing chronograph in accordance with claim 2 wherein said relay also has contacts in circuit with the solenoid of the printing impression taking means, said last-mentioned contacts being closed on energisation of said relay coil.

4. A printing chronograph in accordance with claim 3 wherein said time printing means comprise a counter and an energising circuit for the solenoid of the impression taking means, said energising circuit including a switch with an operative connection to the counter whereby said last-mentioned switch is operable to close the circuit only when the counter is stationary.

5. A printing chronograph in accordance with claim 1 further comprising a master unit, a slave unit having at least one printing member for printing symbols representing events, solenoid operated means for conditioning said printing member for printing, solenoid operated means for taking a printing impression from said printing member when conditioned, means for producing on the occurrence of an event an electrical impulse of fixed short duration independent of the length of the event and effective to cause operation of said last-mentioned conditioning means for the said printing member and effective to cause operation of the impression taking means, and a connection to the master unit for effecting operation thereof simultaneously to take an impression of the time printing symbols.

6. A printing chronograph in accordance with claim 1 wherein said time symbol printing means comprise a counter with type faces, a motor for driving the counter at a constant average rate, an intermittent drive from the motor to the counter and means for restricting operation of the impression-taking means to the intervals between the movements of the counter comprising switch means operable in synchronism with the counter and controlling the operation of the printing impression-taking means, said switch means comprising a rotatable intermittent contact member having a set of circumferentially spaced contact segments, a fixed brush in contact therewith and means for driving the contact member continuously in synchronism with the motor.

7. A printing chronograph in accordance with claim 6 wherein said switch means includes a rotatable contact member having at least two sets of contact segments with different numbers of contacts in each set and brush means for contacting the several sets of contacts, said chronograph further including means for selecting any one of the sets of contacts for use to control the operation of the printing impression-taking means.

References Cited in the file of this patent

UNITED STATES PATENTS

| | | |
|---|---|---|
| 2,195,868 | Naylor et al. | Apr. 2, 1940 |
| 2,196,194 | Cooper | Apr. 9, 1940 |
| 2,229,696 | Engst | Jan. 28, 1941 |
| 2,344,497 | Cooney | Mar. 21, 1944 |
| 2,355,514 | Deane et al. | Aug. 8, 1944 |
| 2,447,803 | Hobby | Aug. 24, 1948 |
| 2,447,839 | Bingley | Aug. 24, 1948 |
| 2,477,062 | Jacobi | July 26, 1949 |
| 2,483,408 | Garber | Oct. 4, 1949 |
| 2,633,401 | Mitchell | Mar. 31, 1953 |
| 2,703,268 | Rixford et al. | Mar. 1, 1955 |
| 2,713,533 | Forrellad | July 19, 1955 |
| 2,773,733 | Lorenz | Dec. 11, 1956 |

FOREIGN PATENTS

| | | |
|---|---|---|
| 1,041,450 | France | Oct. 23, 1953 |